US008991799B1

(12) United States Patent
Ellis (10) Patent No.: US 8,991,799 B1
(45) Date of Patent: Mar. 31, 2015

(54) SHOCK ABSORBING ASSEMBLY FOR A HYDRAULIC CATWALK

(71) Applicant: J. Thomas Ellis, Athens, LA (US)

(72) Inventor: J. Thomas Ellis, Athens, LA (US)

( * ) Notice: Subject to any disclaimer, the term of this patent is extended or adjusted under 35 U.S.C. 154(b) by 31 days.

(21) Appl. No.: 13/716,524

(22) Filed: Dec. 17, 2012

Related U.S. Application Data (60) Provisional application No. 61/635,597, filed on Apr. 19, 2012.

(51) Int. Cl.
*F16F 3/08* (2006.01)
*F16M 5/00* (2006.01)
*F16F 1/36* (2006.01)

(52) U.S. Cl.
CPC ........................................ *F16F 1/36* (2013.01)
USPC .......................... 267/136; 267/140.2; 248/638

(58) Field of Classification Search
USPC .................. 267/140.4, 141.1, 152, 153, 294; 52/167.7, 167.8; 248/632–638
See application file for complete search history.

(56) References Cited

U.S. PATENT DOCUMENTS

| 4,347,028 | A |   | 8/1982  | Dugan               |
|-----------|---|---|---------|---------------------|
| 4,379,676 | A |   | 4/1983  | Frias               |
| 4,474,520 | A |   | 10/1984 | Buckner et al.      |
| 4,571,215 | A | * | 2/1986  | Hansen ........... 464/180 |
| 5,014,474 | A | * | 5/1991  | Fyfe et al. ........ 52/167.8 |
| 5,242,147 | A | * | 9/1993  | Kemeny ........... 248/638 |
| 5,655,756 | A | * | 8/1997  | Robinson ........ 267/140.2 |
| 6,676,116 | B2| * | 1/2004  | Hand et al. ........ 267/136 |
| 7,163,367 | B2|   | 1/2007  | Handley             |
| 8,052,368 | B2|   | 11/2011 | Littlewood et al.   |
| 8,336,209 | B2| * | 12/2012 | Sprainis et al. ...... 29/896.93 |

\* cited by examiner

*Primary Examiner* — Christopher Schwartz
(74) *Attorney, Agent, or Firm* — Lee & Hayes, PLLC; Charles L. Warner (57) ABSTRACT

A shock absorbing assembly (10) has a front plate (12) and a rear plate (14) separated by spacers (16). The plates and the spacers each have holes (18A, 18B), the upper holes (18A) in the front plate preferably being threaded. Fasteners, such as but not limited to threaded rods (22A, 22B) and locknuts (24A, 24B), hold the spacers in position between the front plate and the rear plate. The threaded rods (22A) are screwed into the threaded holes in the front plate but do not protrude from the front face of the front plate. The threaded rods (22A) are secured by locknuts 24A on one end and the threaded rods (22B) are secured by locknuts 24B on both ends. The rear plate also has a pair of engagement plates (20) which position the assembly on the catwalk.

18 Claims, 5 Drawing Sheets

SHOCK ABSORBING ASSEMBLY FOR A HYDRAULIC CATWALK

PRIORITY CLAIM

This application claims the priority of U.S. Provisional Patent Application Ser. No. 61/635,597 filed Apr. 19, 2012, by Tommy Ellis, and entitled "SPRING ASSEMBLY FOR A HYDRAULIC CATWALK", the entire content of which is hereby incorporated by reference herein.

BACKGROUND

In drilling operations, a hydraulic catwalk is often used to move pipe from a storage location to a desired position on the drilling rig and, when the pipe is being removed from the well, to move the pipe from the drilling rig to the storage location.

Examples of hydraulic catwalks are shown in U.S. Pat. Nos. 4,379,676, 4,347,028, 4,474,520, 7,163,367, and 8,052,368. When a pipe is being removed from a well it is moved into a raised position on the drilling rig, the free end of the pipe is laid on the ramp of the hydraulic catwalk and the pipe is released. The pipe is then removed from the bottom of the ramp and placed in a holding in a pipe rack or storage area. The pipe may obtain considerable momentum as it slides down the ramp and this can damage the pipe and components of the catwalk. On at least one system a shock absorber is employed to absorb some of the impact forces from the pipe hitting the end of the ramp.

It will be appreciated that such a shock absorber must withstand repeated impacts from pipes being lowered onto the ramp. For example, pipe is normally in 30 foot lengths, so a 9,000-foot well would require 300 such pipes. Removing all of these pipes from the well will therefore subject the shock absorber to 300 such impacts. It has been found, however, that shock absorbers used with some contemporary hydraulic catwalks do not withstand very well the repeated impacts from the pipe being lowered onto the ramp and then released. In fact, some commonly-used shock absorbers have been known to fail during the pipe retraction sequence for a single well. This slows the pipe removal process until the shock absorber has been replaced.

SUMMARY

The shock absorbing assembly disclosed herein withstands such repeated impacts better than other designs and is easier to maintain and repair than other designs. A "shock absorbing assembly" may sometimes be referred to herein as a "shock absorber" or a "spring assembly".

A shock absorber includes a front plate, a rear plate, a plurality of shock absorbing spacers interposed between the front plate and the rear plate, and a plurality of upper and lower fasteners to hold the spacers in position between the front plate and the rear plate. The rear plate has opposing side edges and a pair of engagement plates which extend from at or near those edges toward the front plate and serve to hold the shock absorbing assembly in place in, for example, a trough on a catwalk. The upper fasteners are preferably affixed to the front plate and extend from the front plate, through holes in the spacers, and through holes in the rear plate. The lower fasteners preferably extend through holes in the front plate, through holes in the spacers, and through holes in the rear plate.

An upper fastener may be a threaded rod and a locknut, or a bolt. The rod or the bolt may be fully threaded or only partially threaded. A threaded rod or a bolt may be screwed into the upper holes in the front plate. Alternatively, a threaded rod may be welded onto the front plate, with locknuts being used to secure the threaded rods. Threaded rods and locknuts may be used as the lower fasteners.

The spacers are a durable, compressible, resilient material, such as but not limited to "horsemat" or other recycled rubber.

Handles provide for convenient installation and removal of the shock absorbing assembly, and safety chains may be used for restraining the shock absorber.

DETAILED DESCRIPTION

Figure 1:
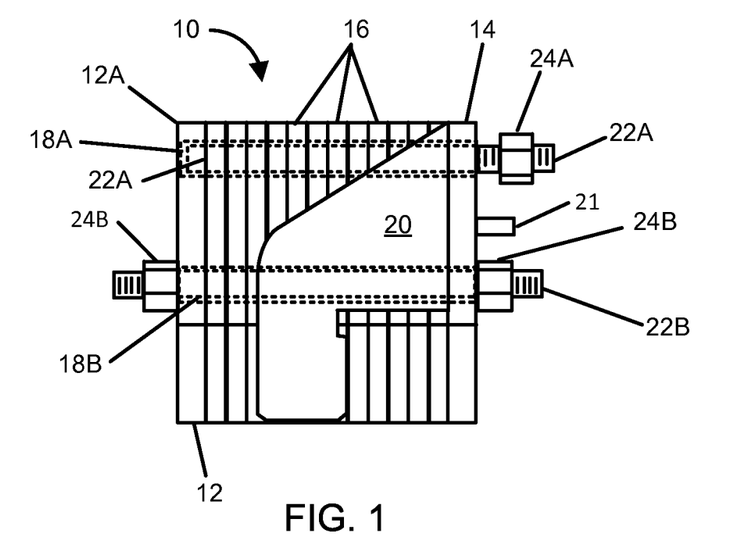
FIG. 1 is a side view of an exemplary configuration of a shock absorbing assembly.

Turn now to the drawing in which like numerals represent like components throughout the several figures. FIG. 1 is a side view of an exemplary configuration of a shock absorbing assembly 10. The shock absorbing assembly 10 includes a front plate 12, a rear plate 14, and a plurality of shock absorbing pads or spacers 16. The front and rear plates 12, 14 protect the spacers 16, and the spacers 16 provide the shock absorbing function of the assembly 10.

Figure 2:
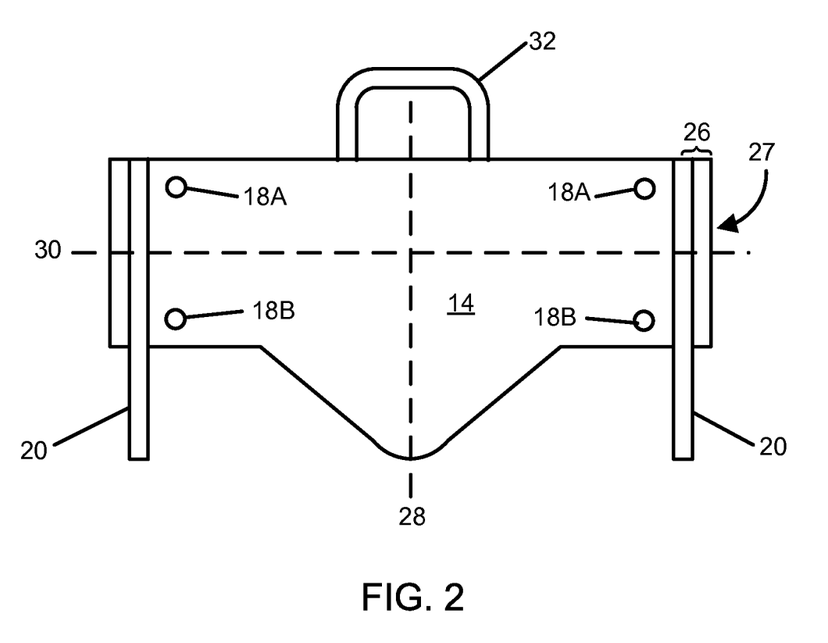
FIG. 2 is an illustration of an exemplary rear plate.
Figure 6:
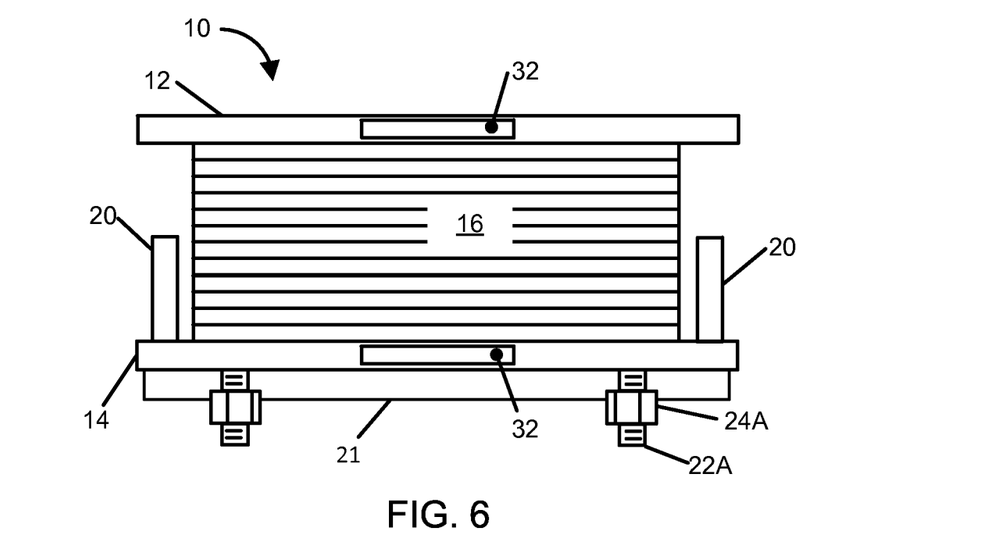
FIG. 6 is a top view of an exemplary configuration of a shock absorbing assembly.

The rear plate 14 has engagement plates 20 extending toward the front plate 14; the engagement plates 20 are preferably slightly offset from opposing side edges of the rear plate, as better seen in FIGS. 2 and 6. The engagement plates 20 of the rear plate 14 serve to connect the shock absorbing assembly 10 to a trough on a hydraulic catwalk. The trough often has a slotted plate and the engagement plates 20 engage the slots of the trough. The engagement plates 20 can also be used to engage bars, hooks, and other components or mechanisms to hold the assembly 10 in place. The rear plate 14 preferably, but not necessarily, also has a stiffener bar 21, which may be, by way of example and not of limitation, ¾ inch or 1 inch flatbar. The bar 21 is preferably welded onto the rear plate 14.

Figure 7:
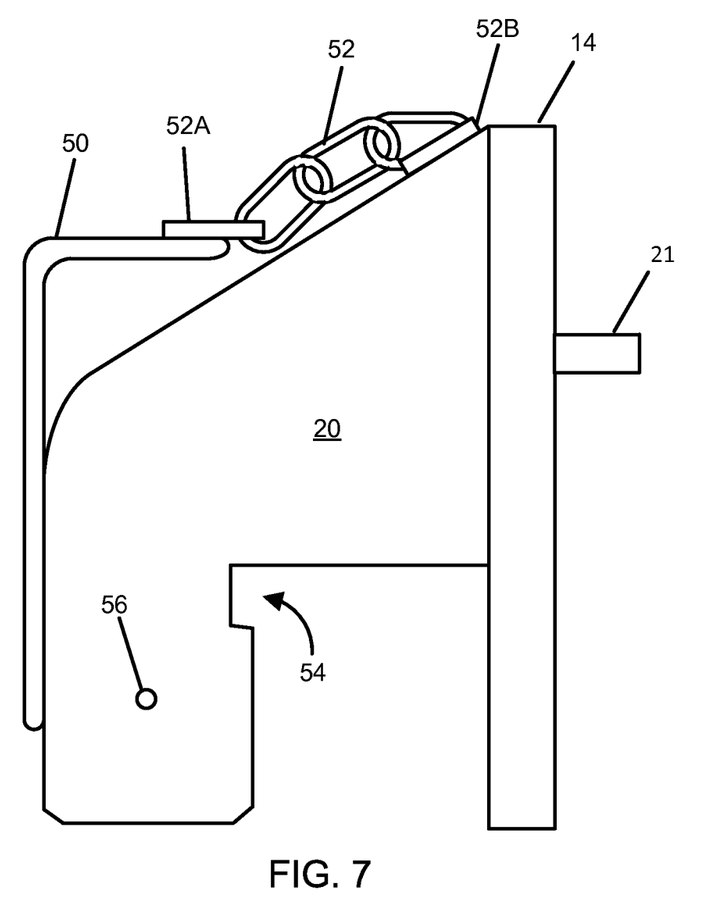
FIG. 7 is a side view of an exemplary rear plate showing a safety chain.

The rear plate 14 also preferably, but not necessarily, has a pair of safety chains, as shown in FIG. 7, which serve to reduce the likelihood that the assembly 10 will become twisted in the trough, or ejected from the trough, due to the impact from the incoming pipe.

The catwalk and trough are not shown herein but examples of catwalks, troughs, and/or shock absorber assemblies are shown in FIGS. 1 and 2 of the '676 patent, FIGS. 1 and 3-8 of the '028 patent, FIGS. 1-8, 11, 12, and 14-23 of the '520 patent, FIGS. 2-9 and 13-15 of the '367 patent, and FIGS. 1-8 of the '368 patent. The '520 patent also shows a shock absorber mechanism.

The upper holes 18A preferably go completely through the rear plate 14, the spacers 16, and the front plate 12. The holes 18A in the front plate 12 are drilled ⅞ inch and then threaded 1 or 1⅛ inch. The holes 18A in the rear plate 14 and in the spacers 16 are 1 inch diameter, but are not threaded. The lower holes 18B preferably go through at least the rear plate 14, and the spacers 16, and at least partially through, and preferably completely through, the front plate 12. The holes 18B are 1 1/16 to 1 1/8 inch diameter and preferably are not threaded. This allows the fasteners 22B to slide or float on the plates and spacers rather than bending.

Fasteners are used to hold the assembly 10 together and to hold the spacers 16 in position between the front and rear plates 12, 14. In one configuration two 1-inch threaded rods 22A (top pair) are inserted through the holes 18A in the rear plate 14 and the spacers 16, and are screwed into the front plate 12. Two 1-inch threaded rods 22B (bottom pair) are inserted through the holes 18B in the rear plate 14, the spacers 16, and the front plate 12. If the holes 18A go completely through the front plate 12 then care should be taken that the upper rods 22A do not protrude from the face 12A of the front plate 12. This presents a flat impact face at that part of the front plate 12 so as to avoid or minimize damage to the pipe when it strikes the plate 12. In an alternative configuration, the upper holes 18A in the front plate are threaded blind holes to assure that there are no protrusions from the face 12A. The lower holes 18B and rods 22B could also be configured in this manner, if desired, but they are below the point at which the incoming pipe would strike the front plate 12. Therefore, for convenience, speed, and cost of manufacturing and assembly, the lower holes 18B go completely through the front plate and are not threaded. Locknuts 24A (top) and 24B (bottom) are then screwed onto the rods 22A, 22B to hold the assembly 10 together. The locknuts 24 should not be excessively tightened as compression of the spacers 16 results in less effective shock absorption. Preferably, the locknuts 24A, are installed on the rods 22A, spaced apart from the rear plate, so that the rods 22A can move slightly under impact from the pipe. This serves to minimize bending and distortion of the rods 22A as discussed below.

Although the assembly 10 described herein provides many improvements and longer life over conventional shock absorbers, it is not claimed to be failure-proof. Repeated impacts from the pipes take their toll, as do environmental conditions and the manner in which the assembly is handled when being installed and removed from the catwalk, and during transportation from one well site to another. Therefore, one benefit of the assembly 10 is ease of maintenance and repair. If a fastener breaks or backs out and is lost, it is easily replaced. If a spacer 16 is damaged or becomes brittle, the assembly 10 can be disassembled in a straightforward manner, the damaged spacer 16 removed and replaced, and the assembly 10 easily and quickly reassembled. Thus, costs are reduced and downtime is minimized.

It has been found that the impact of a pipe on the front plate 12 tends to bend the assembly 10 in a manner which stresses the top rods 22A and causes them to eventually bend or break at a rate faster than the bottom rods 22B. Therefore, in one configuration, the top pair of nuts 24A is not screwed down to the plate 14, but only to within 1 to 1.5 inches of the plate 14. Similarly, if bolts are used, in one configuration, the heads of the top pair of bolts is not screwed down to the plate 14, but only to within 1 to 1.5 inches of the plate 14. This reduces the stress on the rods or bolts 22A.

Four sets of holes 18 and fasteners 22, 24 are shown. This number is not critical, and a different number of holes and fasteners may be used if desired. Too many holes and fasteners, however, may unnecessarily increase the cost and/or weight of the assembly 10; and too few holes and fasteners may cause overstressing and premature failure of the fasteners.

As mentioned herein, the spacers 16 provide for shock absorption when the pipe (or any other object being lowered onto the ramp) strikes the front plate 12. The spacers are made from a rugged, durable, slightly compressible, resilient material, such as a synthetic "rubber". In one configuration, the spacers 16 are made from recycled rubber, such as but not limited to "horsemat" rubber, which is made from shredded tires. The spacers may also be made from other recycled rubber or another durable, compressible, resilient material. There may be 10 to 16 spacers. In one configuration there are 12 spacers. The number of spacers is not critical and will depend upon the impact presented by the pipe or other object being lowered and may depend, in some instances, upon the equipment with which the assembly 10 is to be used. Too few spacers 16 may not give the desired shock absorber effect; and too many spacers 16 may increase the cost, cause an undesired rebound of the pipe or object, and/or cause excessive bending or flexing of the rods or bolts 22.

FIG. 2 is an illustration of an exemplary rear plate 14 showing the holes 18, the engagement plates 20, an exemplary offset 26 of the center of an engagement plate 20 from a side edge 27, and a handle 32.

Figure 3:
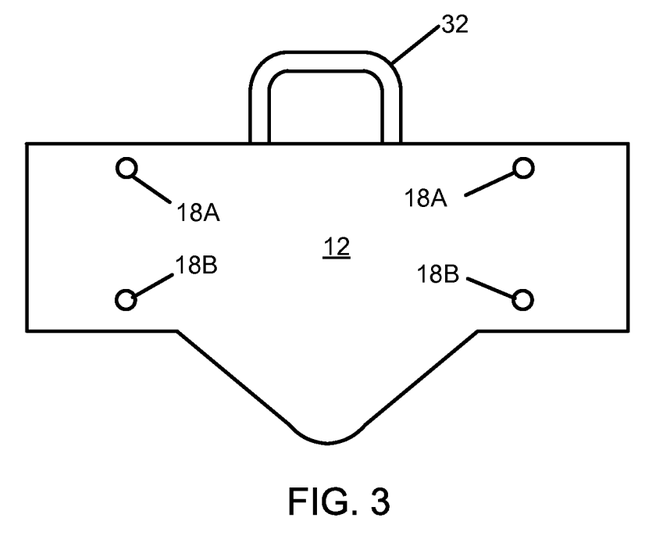
FIG. 3 is an illustration of an exemplary front plate.

FIG. 3 is an illustration of an exemplary front plate 12 showing holes 18 and a handle 32. It can therefore be seen that a front plate 12 is similar in design to a rear plate 14 except that a front plate 12 does not have the engagement plates 20, and the upper holes 18A in the front plate 12 are threaded. As previously mentioned, care should be taken that the rods or bolts 22A do not protrude forward of the front plate 12 as protruding rods or bolts can cause damage to the pipe being delivered. The handles 32 are are used to install the shock absorbing assembly on, and remove the shock absorbing assembly from, the trough of the hydraulic catwalk (not shown).

Exemplary dimensions for the front and rear plates 12, 14 are as follows. The width of a plate is 28 inches, the height of a plate is 10 inches at the tallest point and 6 inches at the sides; and a plate is a 1 inch thick steel plate. There are two holes 18 to the left of the centerline 28, and two to the right of the centerline 28, the holes on opposite sides of the centerline 28 are 18 inches apart, that is, they are offset 9 inches with respect to the centerline 28. The holes 18 on the same side of the centerline 28 are 3 inches apart, that is, they are offset 1.5 inches with respect to the minor centerline 30. The minor centerline 30 is defined with respect to the height of the sides of the plates 12, 14.

The engagement plates 20 of the rear plate 14 are 24.5 inches apart and are equally distant from the centerline 28; the engagement plates 20 also have a thickness of 1 inch; and the centers of the engagement plates 20 are offset 26 from the side edges 27 of the plate 14 by 1.5 to 1.75 inches. This offset value is not critical and other offset values may be used. Too large an offset, however, unnecessarily increases the size, weight and cost of the rear plate 14, whereas too small an offset or no offset may make the engagement plates 20 susceptible to spreading outwardly or to breaking off of the rear plate 14 due to pressure from spreading of the spacers caused by impact from a delivered pipe. The engagement plates 20 extend forward 5½ inches from the rear plate 14. In one configuration the engagement plates 20 are parallel. In another configuration the engagement plates 20 angle slightly toward each other.

It should be noted that the above values are not critical, other values may be used, and the values used may be based on the desire for compatibility with existing equipment. Thus, different values may be used to achieve compatibility, or different values may be used if compatibility is not a concern.

Figure 4:
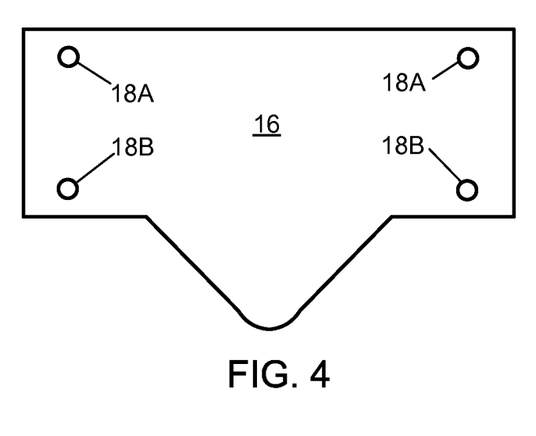
FIG. 4 is an illustration of an exemplary spacer.

FIG. 4 is an illustration of an exemplary spacer 16 showing the general shape, which is similar to the shape of a front plate 12, but not as wide. The spacers 16 preferably are ¾ inch thick. The spacers are preferably no more than 23.5 inches wide so as to fit between the engagement plates 20 and, even more preferably, are only 21.5 inches wide so as not to exert a spreading force on the engagement plates 20 when the spacers 16 are compressed, such as when the assembly 10 is struck by an incoming pipe.

Figure 5:
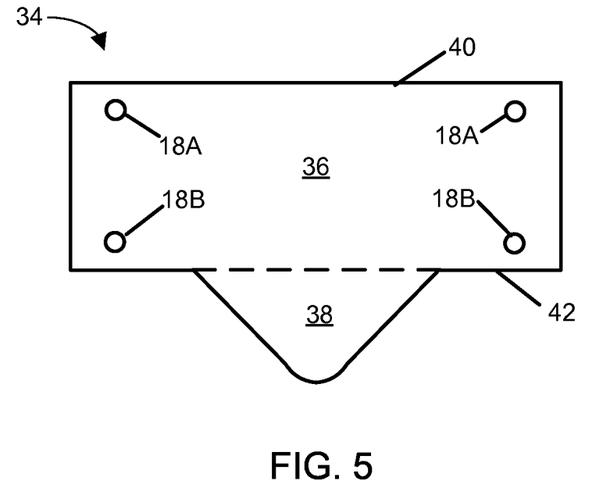
FIG. 5 is an illustration of an exemplary shape for the shock absorbing assembly components.

FIG. 5 is an illustration of an exemplary shape 34 for the shock absorbing assembly components 12, 14, and 16. Excluding the engagement plates 20 and stiffener bar 21 of the rear plate 14, and handles 32, each of the shock absorbing assembly components 12, 14, and 16 may be considered to have the same general shape or design 34. In particular, the preferred shape 34 is that of a rectangle 36 having a triangular extension 38 extending from one edge thereof, the bottom edge in the view shown. One set of holes 18A is proximate to the top edge 40, and another set of holes 18B is proximate to the bottom edge 42. The extension 38 serves to maintain the assembly 10 within the trough of the hydraulic catwalk. Other extension shapes may also be used, including by way of example and not of limitation, a square, a rectangle, part of a sphere, a hemisphere, etc. By reference to the fasteners (components 22 and 24 in FIGS. 1 and 6), and as discussed with respect thereto, it will be noted that, in one configuration, the fasteners used with respect to the holes 18B hold the components 12, 14, 16 together more tightly than the fasteners used with respect to the holes 18A, which may hold the components 12, 14, 16 only loosely together.

FIG. 6 is a top view of an exemplary configuration of a shock absorbing assembly 10 showing the front and rear plates 12, 14, the spacers 16, the engagement plates 20, the stiffener bar 21, the top rods 22A, the top nuts 24A, and the handles 32. Not shown for convenience of illustration are the bottom rods 22B and the bottom nuts 24B. A bottom view would be similar except that the handles 32 would not be visible, some of the construction details of the engagement plates 20 would be visible, and the bottom rods 22B and the bottom nuts 24B would be visible.

FIG. 7 is a side view of an exemplary rear plate 14 showing the safety chain 52. An L-bracket 50 is attached, such as by welding, to the engagement plate 20. A chain 52 is then attached, such as by welding, to the L-bracket 50 and to the engagement plate 20, such as by welding chain links 52A and 52B to the L-bracket 50 and the engagement plate 20, respectively. In practice, a catwalk (not shown) often has a 1″ to 2″ slot on either side of the catwalk and the chains 52 are inserted into the slot. This helps to keep the assembly 10 from being ejected. In another embodiment, a hole 56 is drilled into the side of the plate 20 and threaded. A bolt (not shown) is then screwed partially into the hole 56 so that a portion of the bolt extends from the plate 20. The bolts can then be inserted into the slots to keep the assembly 10 from being ejected. Also, the hook feature 54 of the engagement plate 20 is numbered in this view.

In one alternative configuration, 1-inch bolts (not shown) are used instead of the rods 22 and nuts 24. The head of the bolt is preferably at the rear plate 14 and the distal end of the bolt is screwed into the threaded hole 18 of the front plate 12. It is preferred that the distal ends of the upper bolts do not protrude from the face 12A of front plate, and that there is no nut on the distal end of the upper bolts. This is also to present a flat impact face for the upper part of plate 12 to avoid damage to the pipe when it impacts the plate 12.

If the holes 18A in the front plate are threaded blind holes then the bolt is tightened as described above with respect to the nut 24. The heads of the bolts preferably have a 3/16 inch hole drilled laterally therethrough so as to accommodate a stainless steel tie wire (not shown). The tie wire connects the bolt heads together so as to prevent the bolts from backing out.

In another alternative configuration, only one end of a rod 22 is threaded for use with a nut 24; the other end of the rod 22 is welded to the front plate 12 at the location where a hole 18 is shown. In this configuration the rod 22 may be welded directly to the back face of the front plate 12, or the rod 22 may be inserted into the hole 18 and then welded in place.

Figure 8A:
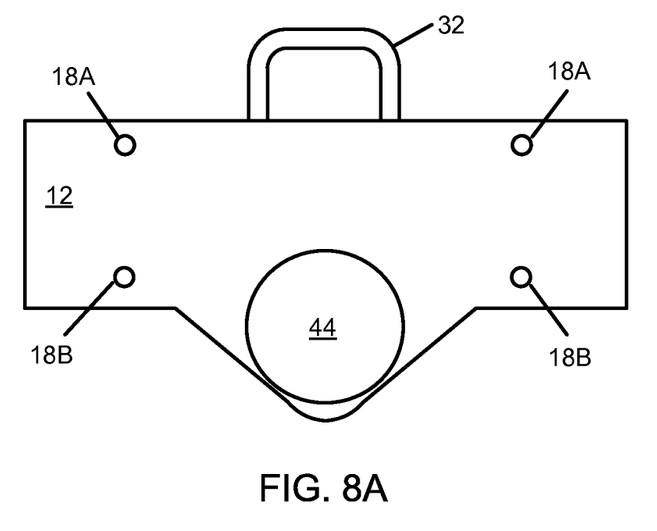
FIGS. 8A and 8B illustrate an exemplary alternative configuration of a shock absorbing assembly.
Figure 8B:
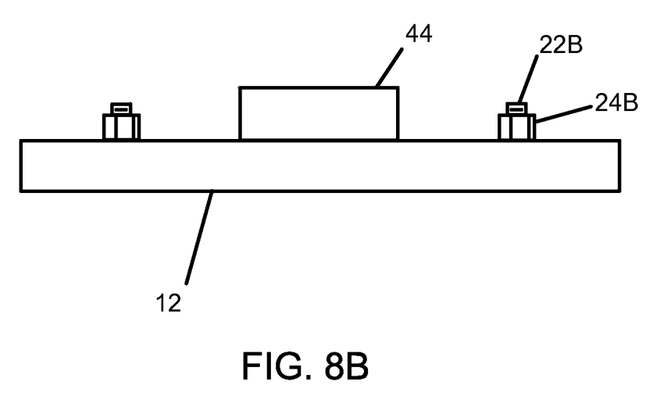

FIGS. 8A and 8B illustrate an exemplary alternative configuration of a shock absorbing assembly 12. After the pipe has slid down the ramp and been stopped by the assembly 12 it is then removed from the ramp by an automatic unloader and placed into a storage bin or area. A problem may occur with some catwalks and with certain pipe sizes in that, as the pipe is being removed, the lower end of the pipe will strike or catch on a lower rod 22B or nut 24B. When this happens the top end of the pipe will move toward the bin but the lower end will be restrained by the rod or nut and not move similarly. This causes the pipe to twist where it is not in position for further automatic unloading, and the pipe may even be ejected from the catwalk. Further, this may damage the rod 22B and/or the nut 24B.

This alternative configuration addresses that problem. A strike plate 44 is added to the lower part of the front plate 12. The strike plate 44 is thick enough to prevent the pipe from contacting a rod 22B or nut 24B when the pipe is being unloaded. The strike plate 44 may be any convenient shape, such as but not limited to a circle, square, rectangle, triangle, polygon, etc. In one embodiment, the strike plate 44 is a 6 inch diameter disk. The strike plate 44 is preferably welded to the front plate 12 but, if desired, can be attached to the front plate 12 by another convenient method or may, if desired, be manufactured as part of the front plate 12.

In another alternative configuration, which also addresses this problem, a strike plate 44 is not used and lower nuts 24B are not used on the front plate 12. Instead, the holes 18B are threaded holes and the rod 22B is screwed into the hole 18B but does not protrude from the front side of the plate 12. The hole 18B may be a blind hole, if desired. This alternative configuration is not as preferred as the configuration using the strike plate 44 because this alternative configuration may result in eventual bending of the rods 22B.

Although bolts and rods have been referred to herein as "threaded", it is acceptable, but not necessary, that they be threaded throughout their length. For convenience of manufacturing or cost considerations, they may be threaded throughout their length. Alternatively, however, the threaded portion may be a portion on the end of the bolt, or on one or both ends of the rod, which is sufficient to allow for the nut to be securely screwed thereon and to allow for variations in the thickness of the plates and spacers and any desired slack in the assembly. Thus, for example, the portion of the bolt near the head of the bolt need not be threaded, and the center portion of the rods need not be threaded. Also, the nuts 24 are preferably, but not necessarily, lock nuts. The lock nuts may be, for example, all metal or metal with a nylon insert.

The five U.S. patents listed above are hereby incorporated in their entirety herein. These patents are listed to illustrate the environment and/or background of the present invention and are not intended to indicate that the present invention is limited to use on or with those particular devices or machines.

The subject matter described above is provided by way of illustration only and should not be construed as limiting. Various modifications and changes may be made to the subject matter described herein without following the exemplary configurations and applications illustrated and described herein. Further, although the subject matter presented herein has been described in specific language, it is to be understood that the components, materials, designs, and manner of assembly described herein are examples, and the appended claims are not necessarily limited to those examples.

The invention claimed is:

1. A shock absorbing assembly, comprising:
    a front plate;
    a rear plate having opposing side edges and a pair of engagement plates extending from proximate the respective opposing side edges toward the front plate, the rear plate having a plurality of holes therein;
    a plurality of shock absorbing spacers stacked in series and interposed between the front plate and the rear plate, at least some of the spacers being positioned between the engagement plates, each spacer having a plurality of holes therein; and
    a plurality of fasteners extending from the front plate and through the holes in the plurality of spacers and the holes in the rear plate, the fasteners maintaining the spacers in position between the front plate and the rear plate;
    wherein the front plate, the rear plate, and the spacers each has a predetermined shape, the predetermined shape comprising at least a rectangle having a top edge and a bottom edge, and wherein a first set of the holes is below the top edge and a second set of the holes is below the first set of the holes and above the bottom edge, and wherein the fasteners extending through the first set holds the front plate, rear plate, and spacers together more loosely than the fasteners extending through the second set holds the front plate, rear plate, and spacers together.

2. The shock absorbing assembly of claim 1 wherein the front plate has a plurality of threaded holes, and wherein a fastener comprises a threaded rod and a nut, the threaded rod having a first end and a second end, the first end being screwed into one of the threaded holes, the threaded rod extending though the holes in the plurality of spacers and the holes in the rear plate and extending beyond the rear plate, the nut being screwed onto the second end.

3. The shock absorbing assembly of claim 2 wherein the nut is a locknut.

4. The shock absorbing assembly of claim 1 wherein the front plate has a plurality of threaded holes, and wherein a fastener comprises a bolt having a head end and a distal end, the distal end being screwed into one of the threaded holes, the bolt extending though the holes in the plurality of spacers and the holes in the rear plate such that the head of the bolt is beyond the rear plate.

5. The shock absorbing assembly of claim 1 wherein a fastener comprises a rod and a nut, one end of the rod being welded to a rear face of the front plate and extending through the holes in the plurality of spacers and holes in the rear plate such that a distal end of the rod extends beyond the rear plate, the nut being screwed onto the distal end.

6. The shock absorbing assembly of claim 1 wherein at least one of the spacers comprises recycled rubber.

7. The shock absorbing assembly of claim 1 wherein at least one of the engagement plates is offset from one of the side edges of the rear plate by a predetermined distance.

8. The shock absorbing assembly of claim 1 wherein at least one of the front plate or the rear plate further comprises a handle.

9. The shock absorbing assembly of claim 1 wherein at least one of the front plate, the rear plate, or a spacer, has a predetermined shape, the predetermined shape being in the form of a rectangle with an extension on one side.

10. The shock absorbing assembly of claim 1 wherein at least one of the front plate, the rear plate, or a spacer, has a predetermined shape, the predetermined shape being in the form of a rectangle with an extension on one side, and wherein the extension is in the shape of a triangle with its apex pointing away from the rectangle.

11. The shock absorbing assembly of claim 1 wherein the front plate has a rear face oriented toward the rear plate, and a front face, and wherein none of the fasteners protrude through the front face.

12. A shock absorber, comprising:
    a front plate having a plurality of holes, at least some holes of the plurality of holes being threaded holes;
    a rear plate having a front face and a rear face, the front face of the rear plate being oriented toward the front plate, the rear plate having opposing side edges and a pair of drive engagement plates extending from proximate respective opposing side edges toward the front plate, the rear plate having a plurality of holes therein;
    a plurality of shock absorbing spacers stacked in series and interposed between the front plate and the rear plate, at least some of the spacers being positioned between the engagement plates, each spacer having a plurality of holes therein;
    a plurality of threaded rods, each threaded rod having a first end and a second end, the first end of at least some of the threaded rods being screwed into one of the threaded holes, the threaded rod extending though the holes in the plurality of spacers and through one of the holes in the rear plate such that the second end is behind the rear face of the rear plate; and
    a plurality of locknuts, at least one locknut being screwed onto the second end of at least one threaded rod;
    wherein the front plate, the rear plate, and the spacers each has a predetermined shape, the predetermined shape comprising at least a rectangle having a top edge and a bottom edge, and wherein a first set of the holes is below the top edge and a second set of the holes is below the first set of the holes and above the bottom edge, and wherein the threaded rods extending through the first set of holes, and their corresponding locknuts, hold the front plate, rear plate, and spacers together more loosely than the threaded rods extending through the second set of holes, and their corresponding locknuts, holds the front plate, rear plate, and spacers together.

13. The shock absorber of claim 12 wherein the predetermined shape further comprises a triangular extension on the bottom edge of the rectangle and having its apex pointing away from the rectangle.

14. The shock absorber of claim 12 wherein the front plate has a rear face oriented toward the rear plate, and a front face, and wherein none of the fasteners protrude through the front face.

15. The shock absorber of claim 12 wherein at least one of the engagement plates is offset from at least one of the side edges of the rear plate by a predetermined distance.

16. The shock absorber of claim 12 wherein at least one of the front plate or the rear plate further comprises a handle.

17. The shock absorber of claim 12 wherein at least one of the front plate, the rear plate, or a spacer, has a predetermined shape, the predetermined shape being in the form of a rectangle with an extension on one side, and wherein the extension is in the shape of a triangle with its apex pointing away from the rectangle.

18. A shock absorber, comprising:
a front plate having a top edge, a bottom edge, a first set of holes, and a second set of holes, the first set being threaded holes, the first set being above the second set;
a rear plate having a plurality of holes, having opposing side edges, and having a pair of drive engagement plates, each drive plate extending from proximate a respective opposing side edge toward the front plate;
a plurality of shock absorbing spacers interposed between the front plate and the rear plate, at least some of the spacers being positioned between the engagement plates, each spacer having a plurality of holes therein;
first and second threaded rods, each of the first and second threaded rods having a first end and a second end, the threaded rods having their respective first ends screwed into the first set of holes in the front plate, the first and second threaded rods passing though the holes in the plurality of spacers and extending through two holes of the plurality of holes in the rear plate such that the respective second ends of the first and second threaded rods extend beyond the rear plate;
third and fourth threaded rods, each of the third and fourth threaded rods having a first end and a second end, having their respective first ends passing through and protruding from the second set of holes in the front plate, the third and fourth threaded rods passing though the holes in the plurality of spacers and extending through two holes of the plurality of holes in the rear plate such that the respective second ends of the third and fourth threaded rods extend beyond the rear plate;
a plurality of locknuts, the locknuts being screwed onto the second end of the first and second threaded rods and being screwed onto the first end and the second end of the third and fourth threaded rods,
wherein at least one of the front plate, the rear plate, or one of the spacers has a predetermined shape, the predetermined shape being in the form of a rectangle with an extension on one side, and wherein the extension is in the shape of a triangle with its apex pointing away from the rectangle; and
wherein at least one of the front plate or the rear plate further comprises a handle, the handle being on an opposing side to the extension.

\* \* \* \* \*